United States Patent Office

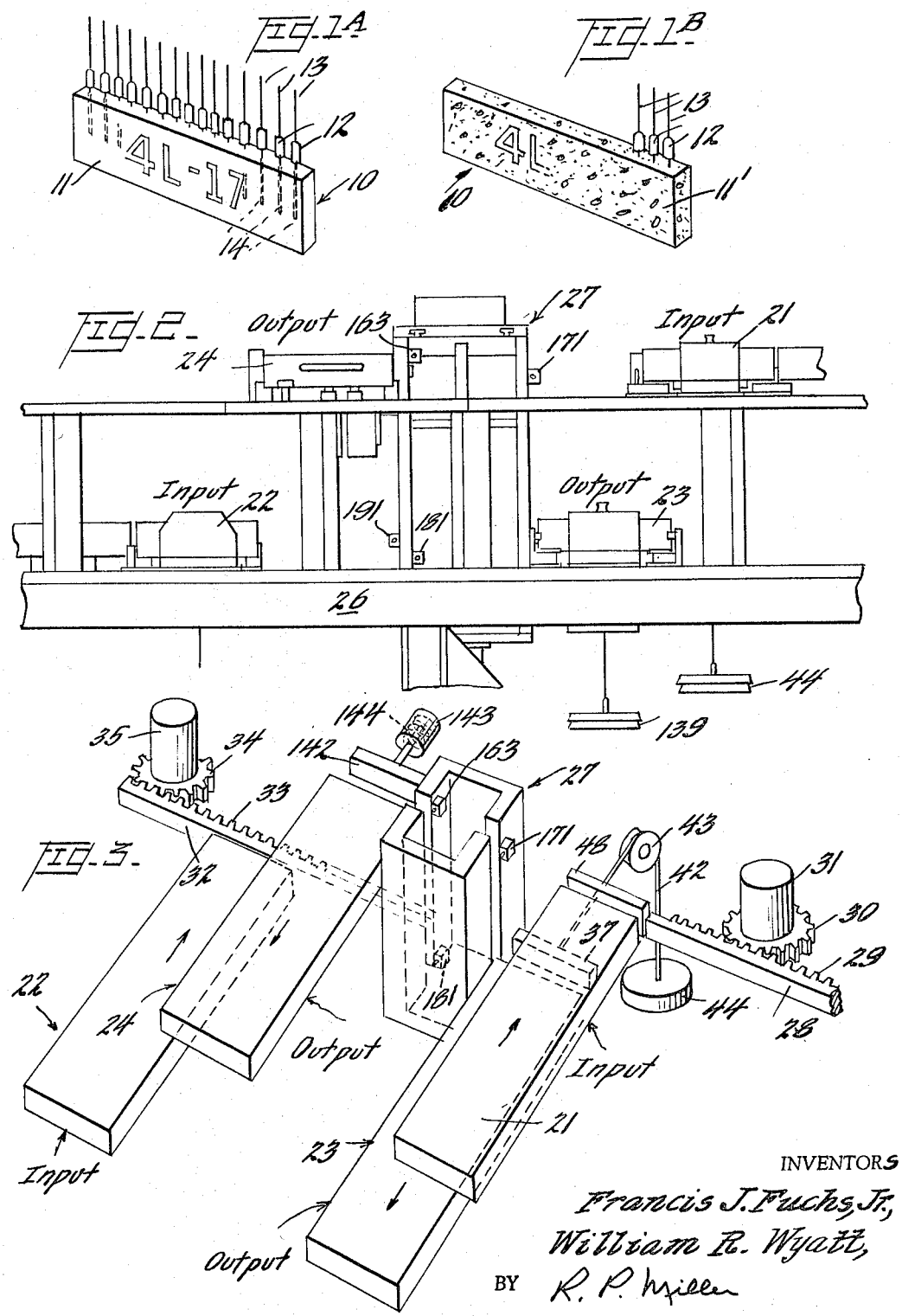

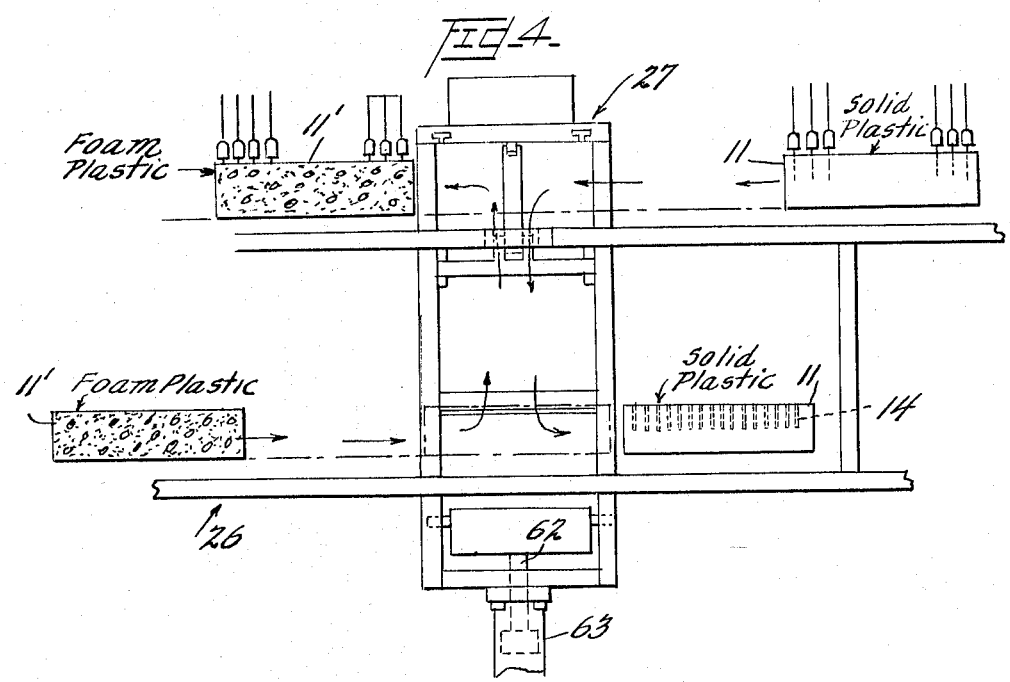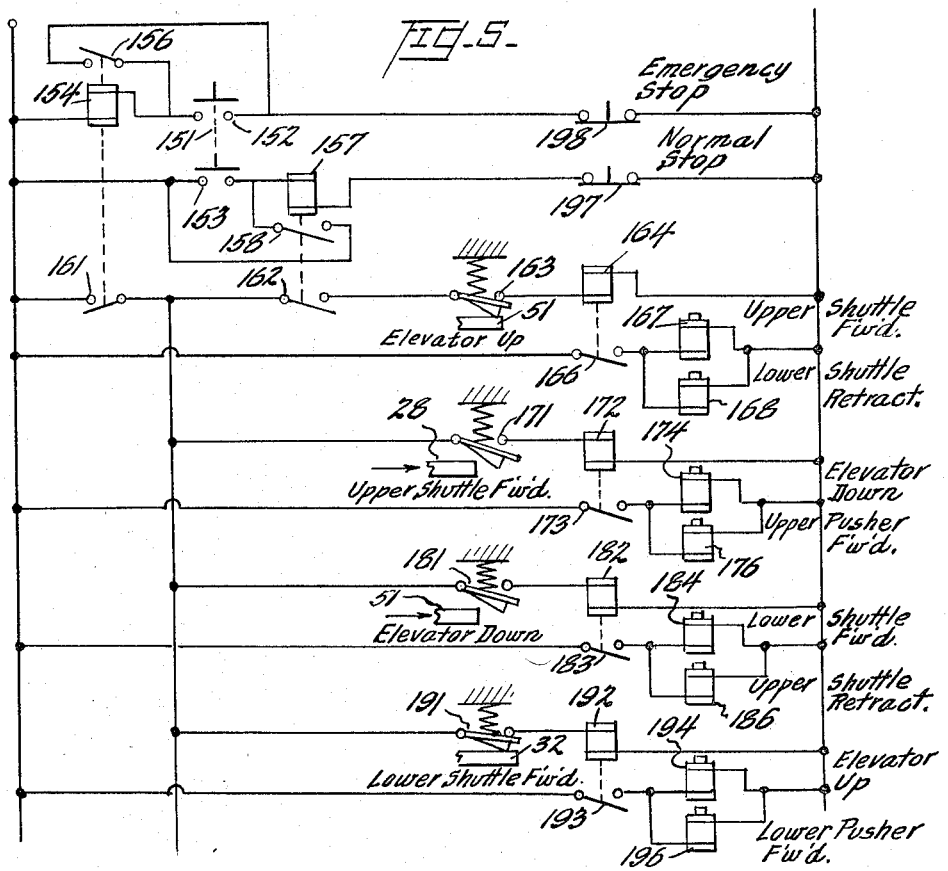

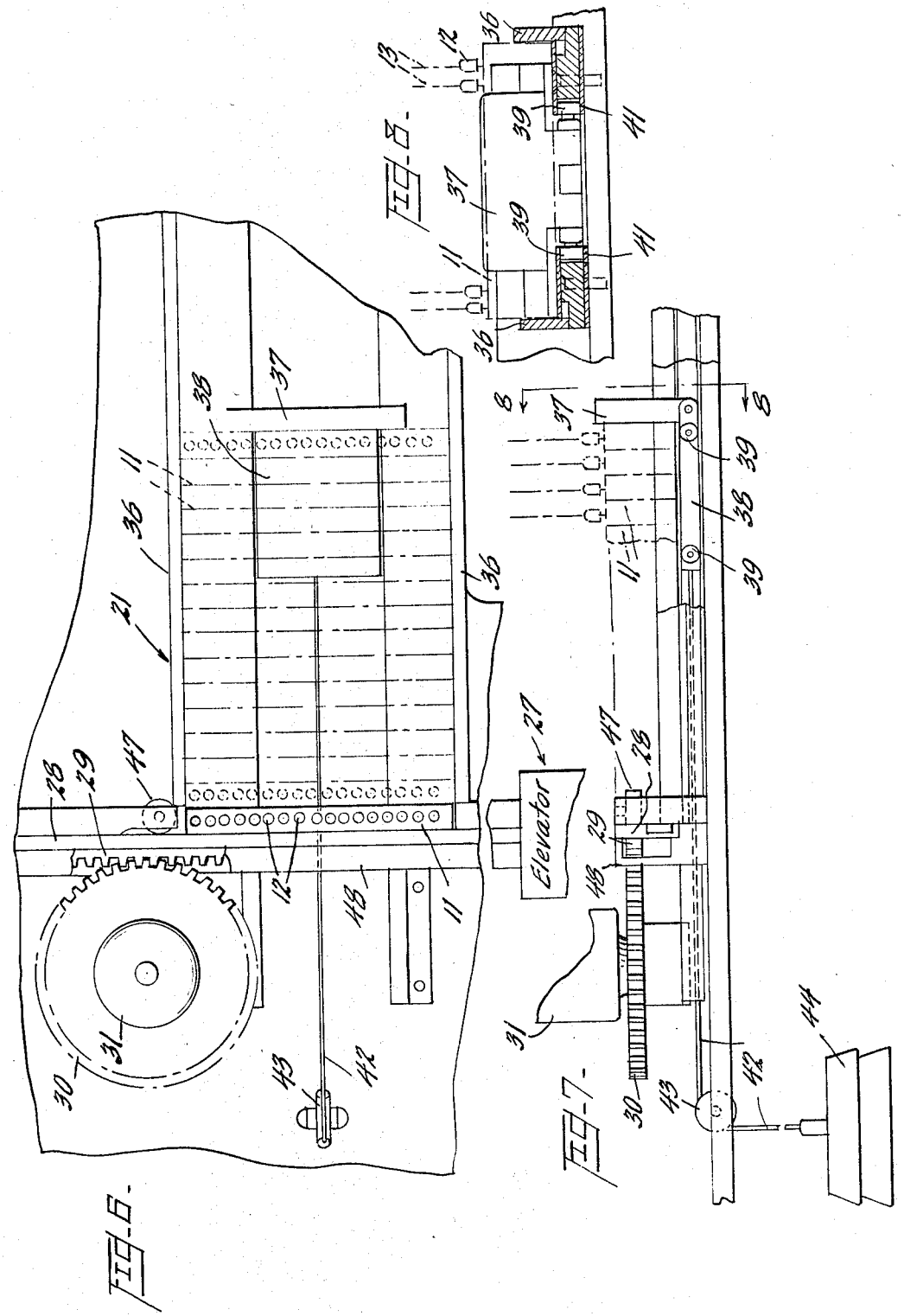

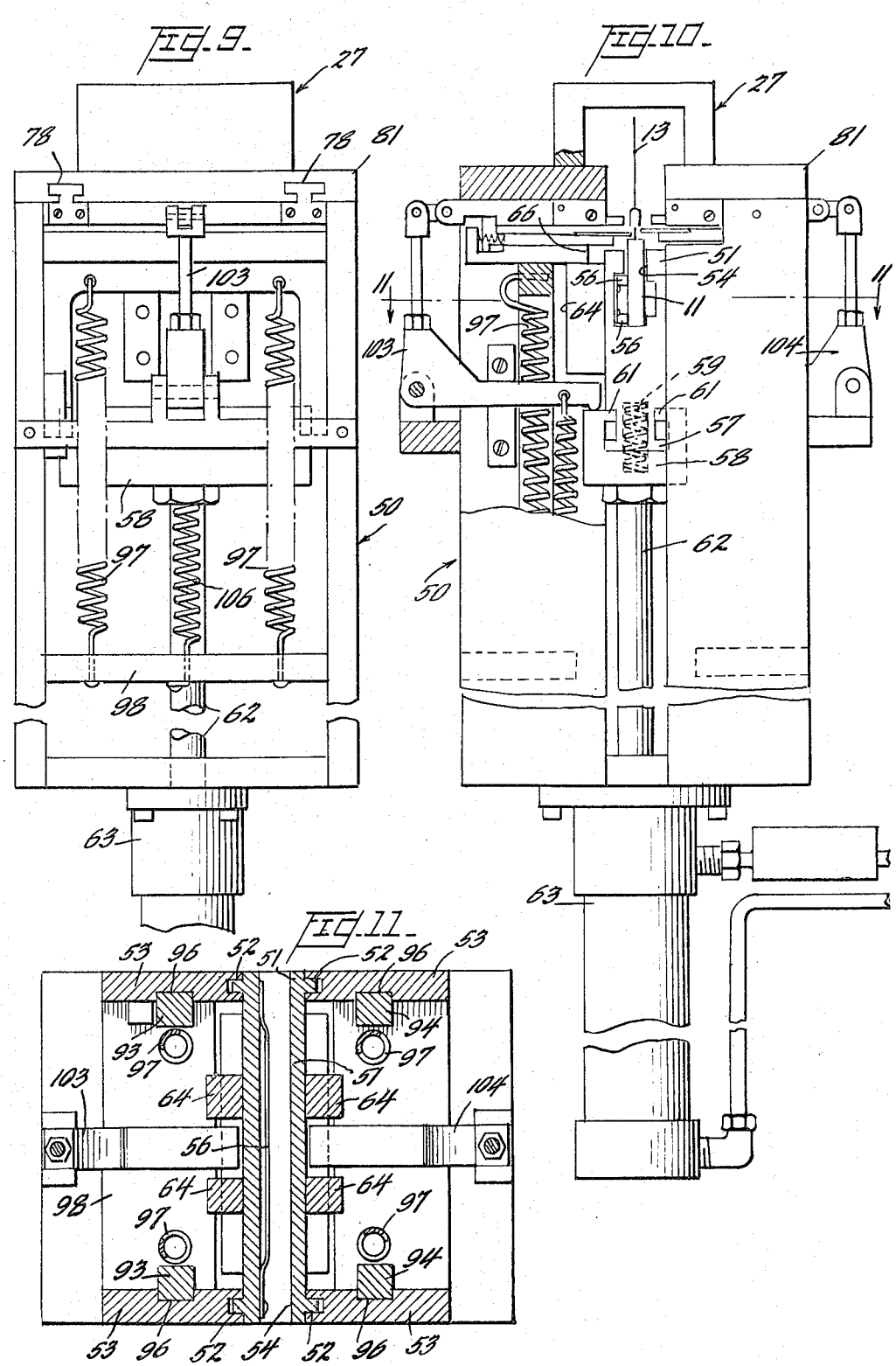

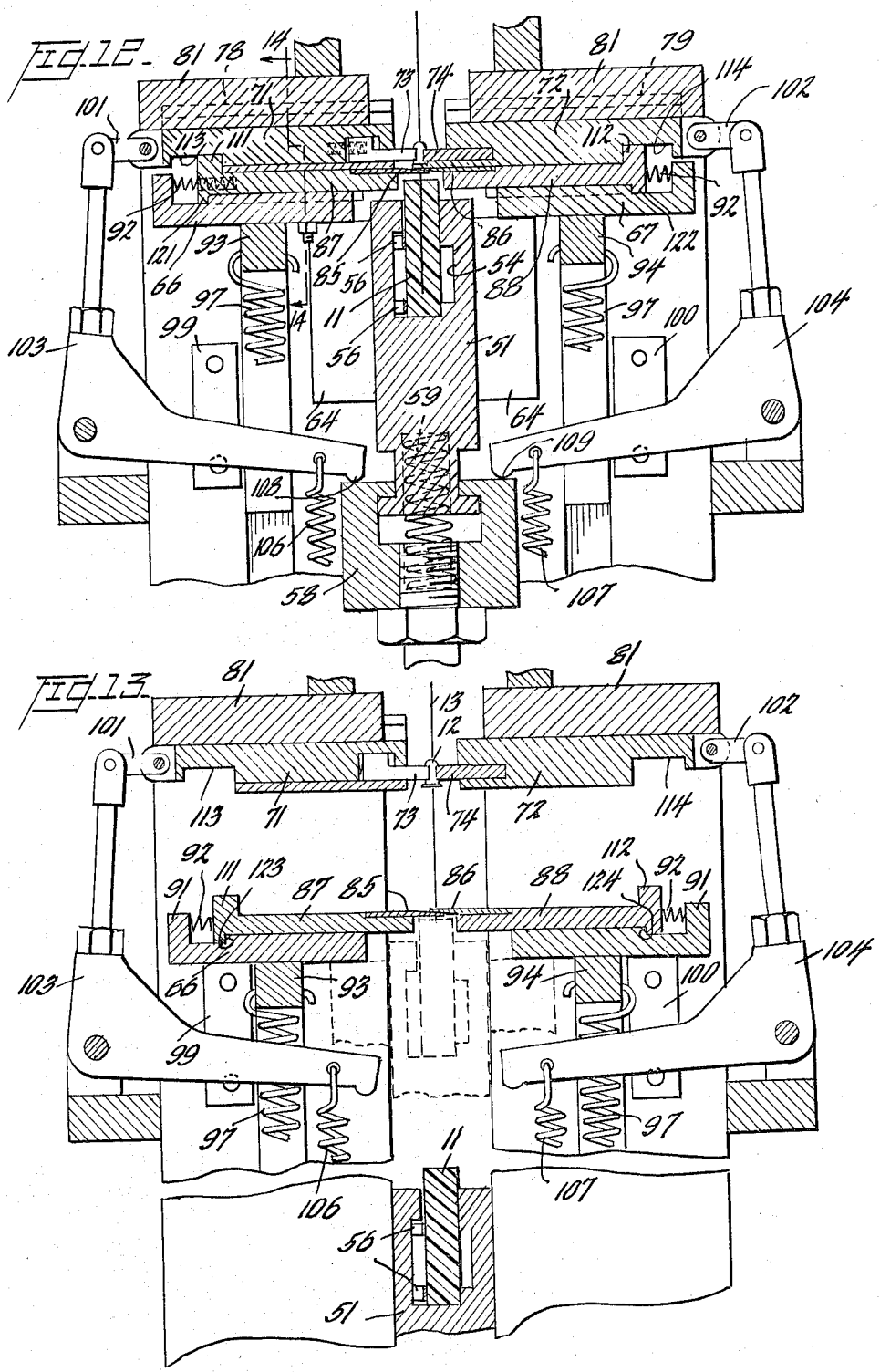

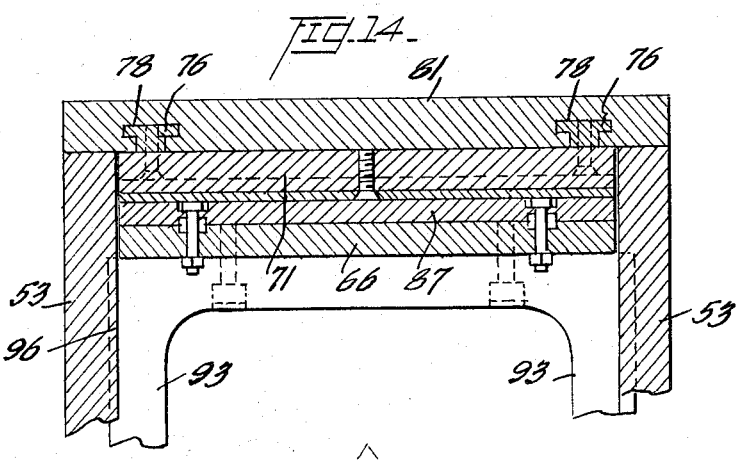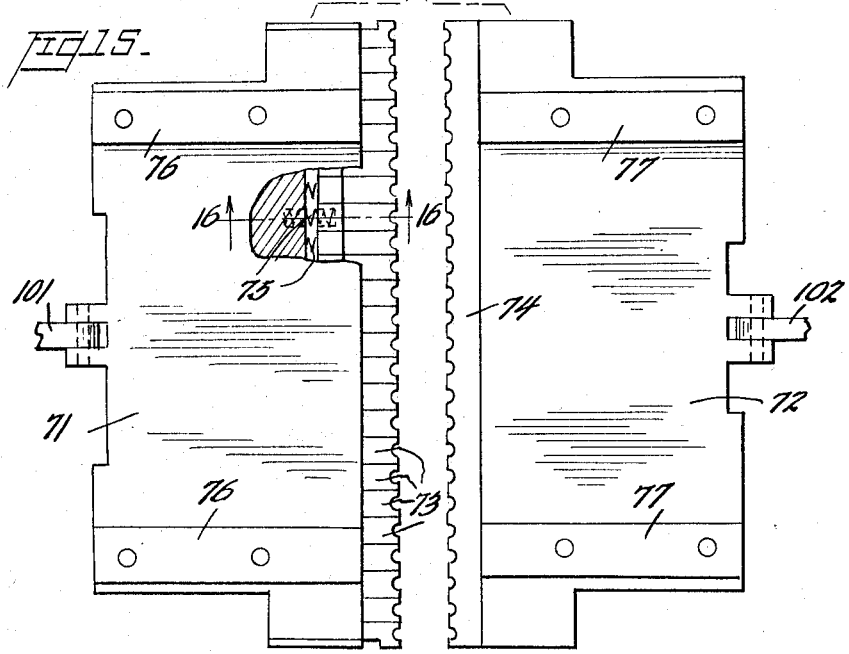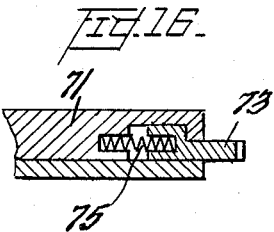

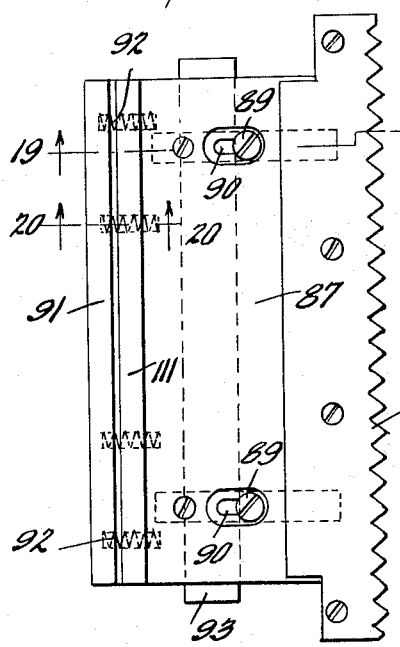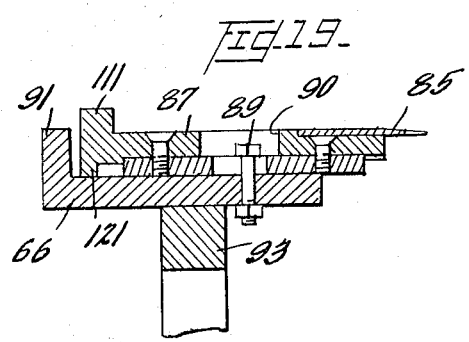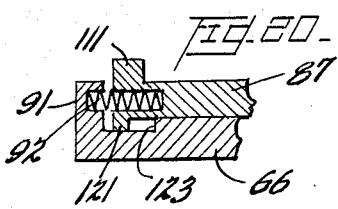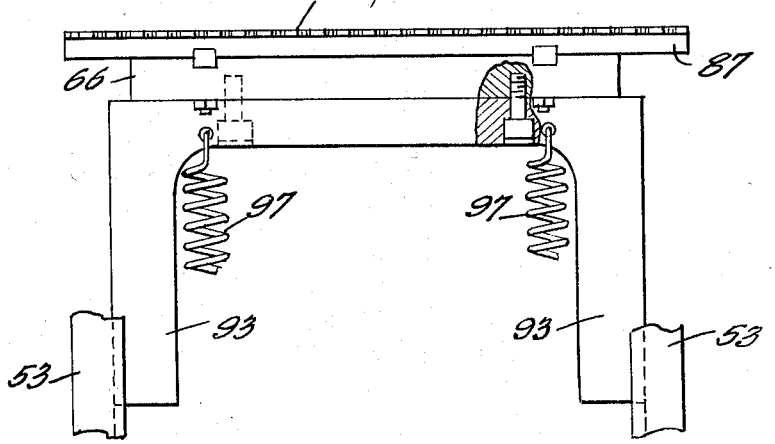

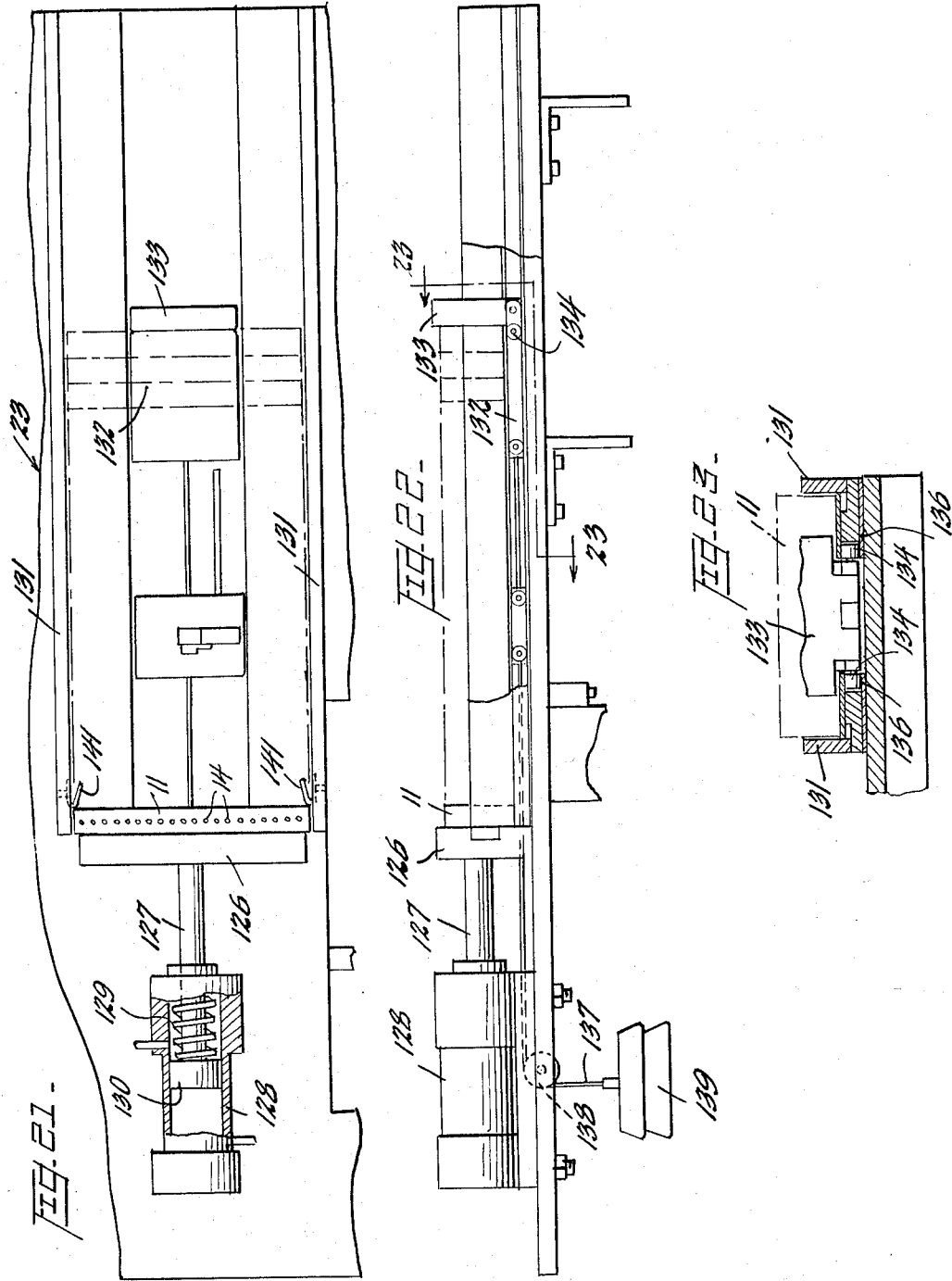

3,286,740
Patented Nov. 22, 1966

3,286,740
METHOD AND APPARATUS FOR TRANSFERRING ELECTRICAL COMPONENTS HAVING LEADS FROM ONE WORK HOLDER TO ANOTHER WORK HOLDER
Francis J. Fuchs, Jr., Princeton Junction, N.J., and William R. Wyatt, Greenville, S.C., assignors to Western Electric Company, Incorporated, New York, N.Y., a corporation of New York
Filed Feb. 25, 1964, Ser. No. 347,201
12 Claims. (Cl. 140—147)

The invention relates to a method and apparatus for transferring electrical components having leads from one work holder to another work holder. More particularly, the invention relates to a method and apparatus for moving a block loaded with components relative to the components to effect separation while simultaneously straightening the leads, and then moving a second block of penetrable material into engagement with the leads so that the leads penetrate and are supported in the second block.

In the manufacture of small electrical components having very fine lead wires, it is difficult to maintain the leads in a straightened condition. It has been found that a convenient way of handling such components is to place the leads of a plurality of the components in a block. The block may then be moved from one work station to another as operations are performed on the components. On occasion it becomes necessary to transfer the components from one type of block to another. In particular, it is desired to transfer the components from a plastic block having apertures which receive the leads, to a foam plastic block wherein the leads penetrate the foam plastic. In the past this transfer has been accomplished by a plurality of machines requiring numerous intermediate steps of handling and feeding. The instant machine avoids may of such intermediate steps and provides a completely automatic transfer. Further, during the transfer, a lead straightening operation is effected.

It is an object of the present invention to provide a new and improved method and apparatus for transferring electrical components from one work holder to another.

It is still a further object of the invention to provide a machine which sequentially feeds a work holder containing electrical components from a supply source, removes the components from the work holder, and inserts the components into a second work holder which is sequentially fed from a second supply source.

It is another object of the invention to provide a new and improved method and apparatus for removing a plurality of electrical components from a package, and for simultaneously straightening the leads.

It is a further object of this invention to provide a carriage which receives an empty penetrable block and moves the block into engagement with a plurality of suspended components to cause the components to penetrate and be packaged in the block.

It is still another object of the invention to provide a new and improved pair of opposed combs which act to straighten the leads in one operation, and act in a second operation to support and guide the leads into a package.

With these and other objects in mind, the present invention contemplates a method and apparatus for transferring electrical components having depending leads from a solid block having apertures to receive the leads into a second block of foam plastic wherein the leads penetrate and are supported in the foam plastic. Solid blocks loaded with components are sequentially fed from a supply source into a reciprocal carriage. As the carriage is retracted with the solid block, the components are held stationary by a clamping device to separate them from the block. The leads are straightened simultaneously by a lead straightening device. When the carriage reaches the fully retracted position, an empty foam plastic block is sequentially fed into the carriage. The carriage with the foam plastic block is advanced toward the components until the leads of the components commence to penetrate the block. As the carriage is advanced further, the lead straightening device guides and supports the leads as they penetrate into the foam plastic block. Upon completion of the advancement of the carriage, the clamping mechanism is released so that the subsequent advancement of another loaded solid block displaces the now loaded foam plastic block into a storage rack. The operation is then repeated.

Other objects and advantages of the invention will become apparent by reference to the following detailed specification and drawings, wherein:

FIG. 1A is a perspective view of a solid block having apertures to receive the leads of electrical components such as diodes that may be unpackaged by the method and apparatus of the present invention shown in the other figures;

FIG. 1B is a perspective view of a penetrable foam plastic block in which electrical components may be packaged by the method and apparatus of the present invention;

FIG. 2 is a side elevation showing the arrangement of block supply and storage racks and the supporting structure therefor;

FIG. 3 is a perspective view of the supply racks and storage racks and showing a pair of shuttles for feeding blocks into the upper and lower ends of an elevator;

FIG. 4 is a side elevation of the elevator showing a solid block loaded with diodes fed from the upper right into the elevator, and an empty foam plastic block fed from the bottom left to displace the solid block;

FIG. 5 is a circuit diagram illustrating control facilities for the apparatus shown in the other figures;

FIG. 6 is a plan view of a supply rack and feeding mechanism for solid blocks loaded with diodes;

FIG. 7 is a side elevation of the supply rack showing a rack and pinion for sequentially reciprocating a shuttle to feed a leading solid block into the elevator;

FIG. 8 is a rear sectional view taken on line 8—8 of FIG. 7 showing a carrier moveably mounted on rollers positioned within parallel trackways for moving solid blocks into alignment with the shuttle;

FIG. 9 is a front elevation view of the elevator;

FIG. 10 is a partially cut away side elevation view of the elevator showing a block positioned in a carriage with clamping members and lead straightening devices out of engagement with the electrical component;

FIG. 11 is a section view taken along lines 11—11 of FIG. 10 showing the carriage and a spring for holding a block in place in the carriage;

FIG. 12 is a side elevation partially cut away showing the clamping members engaging the head of an electrical component, the lead straightening device in engagement with the leads, and a yoke in a partially lowered position;

FIG. 13 is a side elevation partially cut away showing the carriage in a lowered position with an electrical component held between the clamping members, and the lead straightening device in its lowermost position, and showing in phantom outline the carriage as it parts from the lead straightening device;

FIG. 14 is a detail elevation view taken along line 14—14 of FIG. 12 this showing a T-shaped slot for guiding the clamping mechanism;

FIG. 15 is a detailed partially cut away plan view of the clamping mechanism showing opposed cooperating clamping jaws;

FIG. 16 is a detail side elevation view taken on line 16—16 of FIG. 15 showing a slidable spring-biased clamping jaw;

FIG. 17 is a detail front elevation view partially cut away showing a saw-tooth lead straightening device;

FIG. 18 is a detail plan view showing one of the spring-biased lead straightening jaws;

FIG. 19 is a side elevational view taken along line 19—19 of FIG. 18 showing the slidable lead straightening device on a support plate;

FIG. 20 is a side elevation detail view taken along line 20—20 of FIG. 18 showing a spring to bias the lead straightening device;

FIG. 21 is a plan view of a storage rack for receiving empty solid blocks showing a reciprocal pusher member for pushing a block into the storage rack;

FIG. 22 is a side elevation view of the storage rack showing a carrier biased to the left by a weight and movably mounted on rollers for storing blocks; and FIG. 23 is a rear elevation view taken along line 23—23 of FIG. 22 showing the carrier mounted on rollers positioned in parallel trackways.

Referring to the drawings and in particular to FIG. 1, there is shown an article 10 which comprises a block 11 having electrical components such as diodes 12. Diodes 12 are provided with leads 13 mounted in the block 11. The blocks 11 are of two types. Firstly, there are blocks 11 made of a solid plastic material such as that sold under the trademark "Teflon," and which are provided with apertures 14 to receive the leads 13. Secondly, there are blocks 11′ comprised of a penetrable foam plastic such as that sold under the trademark "Styrofoam," in which no apertures are provided. Electrical components may be removed from the solid plastic blocks and packaged in foam plastic of this type by the method and apparatus comprising the instant invention, although it is to be understood that these blocks and electrical components are only examples, and that other articles may be packaged in other containers by the apparatus.

GENERAL ARRANGEMENT

Referring now to FIGS. 2, 3 and 4, there are shown two supply or input racks 21 and 22 and two storage or output racks 23 and 24 for supplying and storing blocks 11 and 11′ in loaded and unloaded conditions. The supply and storage racks are supported on any suitable structure such as that shown at 26. Positioned intermediate the racks is an elevator shown generally at 27. A first shuttle 28 driven by a rack 29, a piston 30 and a rotary air motor 31 feeds the endmost or leading block 11 from supply rack 21 into the top portion of the elevator 27. A second shuttle 32 driven by a rack 33, a pinion 34, and a rotary air motor 35 feeds the endmost foam plastic block 11′ from supply rack 22 into elevator 27 at the bottom.

More particularly, supply rack 21 is loaded with solid blocks 11 filled with diodes 12. The endmost loaded block 11 is advanced by shuttle 28 into elevator 27. Block 11 is then advanced downwardly by the elevator 27 while the diodes 12 are clamped in the raised position (see FIG. 13). When the now empty block 11 reaches the lowered position, shuttle 32 advances to feed the endmost empty penetrable block 11′ from supply rack 22. Empty block 11′ displaces block 11 in the elevator 27 forcing empty block 11 into storage rack 23. Empty penetrable block 11′ is then raised by elevator 27 into engagement with the clamped diodes 12 until the leads 13 penetrate block 11′. A second loaded solid block 11 is then advanced by shuttle 28 to position block 11 on the elevator and displace loaded penetrable block 11′ into storage rack 24.

SUPPLY RACK AND FEED MECHANISM

Referring now to FIGS. 6, 7, and 8 there is shown in detail the supply rack 21 and the feed mechanism comprised of the shuttle 28, rack 29 and pinion 30 for advancing a block 11 into the elevator 27. Blocks 11 are positioned between a pair of guideways 36 and urged toward the left by a follower 37 engaging the right-hand block. The follower 37 is mounted on a carrier 38 movably mounted on rollers 39 positioned within trackways 41. The carrier 38 is connected to a cable 42 that runs over a pulley 43 and is attached to a weight 44. The weight 44 is effective to urge the follower 37 toward the left, thus urging all of the blocks 11 toward an unloading position. The shuttle 28 is cyclically reciprocated through a feeding cycle by the rack 29 and pinion 30 that is driven by the rotary air motor 31. Upon each advance of the shuttle 28, the leading block 11 is picked off and moved toward the elevator 27. The shuttle 28 is guided for movement between a pair of rollers 47 arranged in a vertical plane (only one shown) and a stationary guide 48.

It is to be understood that the supply rack 22 and shuttle 32 and associated driving equipment are similar in structure to the supply rack 21 and shuttle 28, and only the latter is described in detail.

ELEVATOR MECHANISM

Referring to FIGS. 9, 10, and 11, there is shown the elevator 27 comprising a frame 50 for supporting a carriage 51 mounted for movement in guideways 52 formed in a set of four guide plates 53. As shuttle 28 is advanced forward, a block 11 is pushed into a cavity 54 of carriage 51 where it is resiliently held by a pair of leaf spring clamps 56. The lower extremity of the carriage 51 has an inverted T-shaped projection 57 fitted within a yoke 58. A spring 59 tends to urge the arms of the T-shaped projection 57 into engagement with inwardly projecting ledges 61 formed on the yoke 58. The yoke 58 is connected to a piston rod 62 that is reciprocated by an air cylinder 63. The carriage 51 is further provided with four fins 64 projecting outwardly on the sides of the carriage. In the up position the carriage is restrained against further upward movement by engagement of fins 64 with a pair of comb supports 66 and 67; thus the spring 59 is compressed and the T-arms of projection 57 are spaced from the ledges 61.

CLAMPING AND LEAD STRAIGHTENING MECHANISMS

Referring to FIGS. 12 and 13, there are shown the details of the mechanism for gripping the diodes 12 and straightening the leads 13. When a block 11 is positioned within the cavity 54, the diodes 12 are positioned between a pair of oppositely disposed clamp slides 71 and 72. Referring to FIGS. 14 and 15, it will be noted that the clamp slide 71 comprises a plurality of individual, notched clamp fingers 73 biased toward the diodes 12 by springs 75; whereas, the clamp bar 72 comprises a notched rigidly mounting clamp bar 74. The clamp slides 71 and 72 are each provided with a pair of upwardly projecting T-shaped guides 76 and 77 which ride in guideways 78 and 79 of a top plate 81. The clamp bar 74 and the individual fingers 73 are positioned to be moved into engagement with the bodies of the individual diodes 12 mounted in the block 11.

In FIGS. 12 and 13, there is shown a pair of oppositely disposed identical lead straightening combs 85 and 86. The combs are secured to plates 87 and 88 (see also FIGS. 17, 18, and 19, and 20 for the details of plate 87) that are slidably mounted on the supports 66 and 67 by bolts 89 projecting through slots 90. Interposed between the rear extremities of the plates 87 and 88 are projections 91 of the supports 66 and 67 is a plurality of springs 92 which urge the combs 85 and 86 toward the leads 13.

The comb supports 66 and 67 are attached to inverted U-shaped members having legs or comb guides 93 and 94 adapted to ride vertically within guideways 96 in the set of four guide members 53 (see FIGS. 11 and 17). A pair of tension springs 97 is connected between each of the comb guides 93 and 94 and a pair of crossbars 98 (FIGS.

9 and 10) to urge the combs in a downwardly direction. It will be noted that the fins 64 of the carriage 51 engage the comb supports 66 and 67 to hold the supports against downward movement under the urging of the springs 97. A pair of stops 99 and 100 (FIGS. 12 and 13) is provided to limit the downward movement of the comb supports 66 and 67 when carriage 51 is subsequently lowered.

The clamp slides 71 and 72 are connected to links 101 and 102 that, in turn, are pivotally connected to a pair of oppositely disposed L-shaped levers 103 and 104. The levers 103 and 104 are urged to pivot by springs 106 and 107, but are restrained by engagement of cam surfaces 108 and 109 with the upper surface of the yoke 58.

Plates 87 and 88 supporting the combs 85 and 86 are provided with projections 111 and 112 that extend into recesses 113 and 114 formed in the clamp slides 71 and 72. The projections 111 and 112 prevent plates 87 and 88 from moving toward the leads 13 under the urging of springs 92 until the clamp slides 71 and 72 commence movement toward the heads of diodes 12. The extent of movement of the plates 87 and 88 under the urging of the springs 92 is limited by a pair of depending sections 121 and 122 engaging a pair of stop abutments 123 and 124 formed on the comb supports 66 and 67, respectively (FIGS. 12 and 20).

OPERATION OF ELEVATOR, CLAMPS, AND LEAD STRAIGHTENING FINGERS

Referring again to FIGS. 10, 12, and 13, upon actuation of the air cylinder 63 to move the piston rod 62 in a downward direction, the yoke 58 is also moved in a downward direction relative to the carriage 51. This is so because in the initial position, the spring 59 is compressed due to the fins 64 abutting the undersides of the comb supports 66 and 67. In this position of the elements, there is a space between the arms of the T-spaced projection 57 and the inwardly projecting ledges 61. Thus initial downward movement of the yoke 58 is relative to the carriage 51 because the compressed spring 59 holds the elevator block against the comb supports 66 and 67.

Movement of the yoke 58 allows the levers 103 and 104 to pivot under the urgings of the springs 106 and 107. The levers 103 and 104 are effective through links 101 and 102 to move the clamp slides 71 and 72 toward the positioned diodes 12. Movement of slides 71 and 72 toward the diodes, allows plates 87 and 88, under the urging of springs 92, to move toward the leads 13. Plates 87 and 88 were previously held stationary because projections 111 and 112 were fixed in recesses 113 and 114.

Thus the clamp slides 71 and 72 move in unison with the combs 85 and 86. The individual fingers 73 and the notched clamp bar 74 firmly grip the diodes 12 while the combs 85 and 86 engage the leads 13. The combs 85 and 86 accurately position the leads prior to the clamping of the diodes 12 due to the fact that the combs are initially positioned in closer proximity to the leads 13 than the clamp fingers 73 and clamp bar 74 are to the diodes 12.

Further downward movement of the piston rod 62 allows the inwardly projection ledges 61 to engage the T-section 57 to move the carriage 51 in a downward direction. During this downward movement, the solid plastic block 11 is firmly retained in the carriage 51 by leaf spring clamps 56.

As fins 64 of carriage 51 move downwardly, comb supports 66 and 67 are allowed to move also, under the urging of springs 97. Thus the combs 85 and 86 move along the length of leads 13 in slidable engagement therewith. This provides an effective straightening of the leads. The downward movement of the comb supports 66 and 67 is limited by the pair of stops 99 and 100; hence, the combs 85 and 86 are positioned at rest near the extremities of the leads 13. The piston rod continues to move the carriage 51 downwardly until the carriage and block 11 are at the bottom of elevator 27. The diodes 12 remain suspended at the up position by clamp fingers 73 and clamp bar 74.

STORAGE RACK

Referring to FIGS. 21, 22 and 23, there is shown in detail the storage rack 23 having a pusher plate 126 connected to a piston rod 127 which is operated by an air cylinder 128. A compression spring 129 is positioned between a piston 130 and the housing of air cylinder 128 to urge the pusher plate 126 into a normally retracted position. Guide rails 131 are provided on either side of rack 23. A carrier 132 having a back plate 133 is moveably mounted on rollers 134 positioned within trackways 136. The carrier 132 is connected to a cable 137 that runs over a pulley 138 to connect with a weight 139. The weight 139 is effective to urge the back plate 133 to the left. Pusher plate 126 is effective to urge empty solid blocks 11 past a pair of spring clips 141 onto carrier 132 against the force of weight 139.

When carriage 51 reaches the down position, shuttle 32 is actuated to feed the endmost empty penetrable block 11′ from supply rack 22 into cavity 54 of carriage 51 to displace empty solid block 11. Block 11 is displaced into register with pusher plate 126 which is then actuated to push block 11 past spring clips 141 onto carrier 132 of storage rack 23.

ADVANCE OF PENETRABLE BLOCK ONTO DIODE LEADS

Referring again to FIGS. 12 and 13, the air cylinder 63 is operated to move the piston rod 62 in an upward direction. A penetrable block 11′ is now positioned in the carriage 51 and is advanced into engagement with the leads 13. As the penetrable block 11′ is advanced into engagement with the ends of the leads 13, the fins 64 on the carriage 51 engage and move the comb supports 66 and 67 upwardly. The combs 85 and 86 will thus ride up along the leads 13 as the leads are penetrating block 11′. This action provides support for the leads and insures that the leads enter the block 11′ at the proper angle. As the yoke 58 advances into engagement with cam surfaces 108 and 109, the levers 103 and 104 are pivoted to withdraw the clamp fingers 73 and the clamp bar 74. At this time, the projections 111 and 112 are positioned within the recesses 113 and 114 so that movement of the clamps 71 and 72 is effective to move the plates 87 and 88 with combs 85 and 86 out of engagement with the leads 13.

When the carriage 51 reaches the fully up position (FIG. 10), the shuttle 28 is again rendered effective to advance a loaded solid block 11 to displace the now loaded penetrable block 11′ in cavity 54 of carriage 51. The block 11′ is pushed into register with a pusher plate 142 (see FIG. 3) driven by an air cylinder 143, similar to plate 126 and air cylinder 128. A spring 144 normally urges pusher plate 142 into a retracted position. Plate 142 is then rendered effective to push block 11′ into the storage rack 24 which is similar to rack 23.

OPERATION

Attention is now directed to FIG. 5 showing a circuit for controlling the operation of the apparatuses comprising the installation. Initially, it will be assumed that a first block 11 is positioned in register with shuttle 28 ready for advancement (FIG. 3). It is further assumed that air pressure is available to operate rotary air motors 31 and 35, and air cylinders 63, 128, and 143.

In order to initiate cyclic operation of the apparatus, a cycle start button 151 having two sets of contacts 152 and 153 is depressed to complete a circuit to energize a relay 154 which draws up a contact 156 to complete a locking circuit about start button 151. At the same time a circuit is completed to energize a relay 157 which draws up a contact 158 to complete a locking circuit about the contact 153 of start button 151.

Energization of relays 154 and 157 also draws up contacts 161 and 162, respectively, which completes a circuit through a now closed limit switch 163 to energize a relay 164. Limit switch 163 (see FIGS. 2 and 3) is located to be closed by the carriage 51 in the up position. Energization of relay 164 draws up a contact 166 to complete a circuit to an upper shuttle forward solenoid 167 that functions to control the application of air to the rotary air motor 31. Rotary air motor 31 rotates pinion 30 to advance rack 29 and shuttle 28 with a loaded solid block 11.

At the same time a circuit is completed through now closed relay contact 166 to a lower shuttle retract solenoid 168 that controls the application of air to the rotary air motor 35. Air motor 35 retracts shuttle 32 into a position to receive an empty penetrable block 11' from supply rack 22. As shuttle 32 retracts, a limit switch 191 is opened to deenergize a relay 192. Deenergization of relay 192 allows spring 129 to move pusher plate 126 into a retracted position.

When shuttle 28 reaches its forward position, with a block 11 positioned in cavity 54, a limit switch 171 is closed energizing a relay 172 which draws up a contact 173. Closure of contact 173 completes a circuit to an elevator down solenoid 174 that controls the application of air to cylinders 63 to commence lowering of carriage 51.

At the same time a circuit is completed through now closed relay contact 173 to an upper pusher forward solenoid 176 that controls the application of air to the cylinder 143. Air cylinder 143 advances pusher plate 142 to push a loaded block 11' into storage rack 24. As the carriage 51 starts down, limit switch 163 is opened which deenergizes relay 164.

When the carriage 51 reaches the down position, a limit switch 181 is closed energizing a relay 182 which draws up a contact 183. Closure of contact 183 completes a circuit to a lower shuttle forward solenoid 184 that controls the application of air to rotary air motor 35. Rotary air motor 35 rotates pinion 34 to advance rack 33 and shuttle 32 with an empty penetrable block 11'.

At the same time a circuit is completed through now closed relay contact 183 to an upper shuttle retract solenoid 186 that reverses the application of air to the rotary air motor 31. Air motor 31 retracts shuttle 28 into a position to receive another loaded solid block 11. As shuttle 28 retracts, limit switch 171 is opened to deenergize relay 172. Deenergization of relay 172 allows spring 144 to move pusher plate 142 into a retracted position.

When shuttle 32 reaches its forward position, an empty penetrable block 11' is positioned in cavity 54 having displaced an empty solid block 11. The limit switch 191 is then closed energizing relay 192 which draws up contact 193. Closure of contact 193 completes a circuit to an elevator up solenoid 194 that reverses the application of air to cylinder 63 to commence raising the carriage 51.

At the same time, a circuit is completed through the now closed relay contact 193 to a pusher forward solenoid 196 that controls the application of air to the cylinder 128. Air cylinder 128 advances pusher plate 126 to push empty block 11 into rack 23. As the carriage 51 starts up, limit switch 181 is opened which deenergizes relay 182.

When the carriage 51 reaches the up position, limit switch 163 is again closed to energize relay 164, and the cycle repeats.

In order to stop the operation under normal conditions, cycle stop button 197 may be depressed to deenergize relay 157 opening contacts 158 and 162. Since contact 161 is still drawn up, the apparatus will continue to cycle until the carriage 51 reaches the up position at which time the open circuit through contact 162 to relay 164 will cause stoppage of the cycle. It may be noted that at this position the lower shuttle 32 is in the forward position and limit switch 191 is closed. If it is desired to stop the operation immediately, an emergency stop button 198 may be depressed which deenergizes relay 154 opening contacts 156 and 161 which deenergizes relays 164, 172, 182, and 192.

It is to be understood that the above-described arrangements of apparatus and constructon of elemental parts are simply illustrative of an application of the principles of the invention, and many other modifications may be made without departing from the invention.

What is claimed is:

1. A method of removing from a work holder a plurality of electrical components having heads and leads extending therefrom in a common direction, which comprises:
   supporting the work holder,
   clamping the heads of the components to prevent movement thereof,
   advancing the work holder relative to the clamped heads to separate one from the other, and
   simultaneously straightening the leads by moving a comb along the leads.

2. A method of repackaging diodes having leads extending into apertures formed in a first block, which comprises:
   gripping the diodes,
   withdrawing the first block from the leads,
   supporting the leads during the withdrawing of the block and then continuing to support the leads near their ends while the first block moves away from the ends of the leads,
   displacing the first block with a foam plastic second block,
   advancing the second block onto the leads and then along said leads while continuing to support the leads,
   releasing the diodes and leads, and then
   displacing the second block with another first block.

3. A method of transferring electrical components having heads and depending leads extending in a common direction from a first work holder into a second work holder, which comprises:
   supporting the first work holder,
   gripping the heads of the components to prevent movement thereof,
   advancing the first work holder relative to the gripped components to separate the components from the work holder,
   simultaneously straightening the leads by moving a comb along the leads,
   supporting the leads by stopping the combs at the ends of the leads,
   replacing the now empty first work holder with the second work holder of penetrable material, and
   advancing the penetrable work holder onto the straightened leads while moving the comb back along the leads to guide the leads into the advancing work holder.

4. In an apparatus for withdrawing a package from a group of diodes having leads extending into said package and subsequently inserting said leads into a penetrable block,
   means for gripping the diodes,
   means for withdrawing the package from said leads,
   means operated by said withdrawing means for engaging and supporting said leads during withdrawal of the package,
   means operated upon completion of the withdrawal of the package for displacing the package with a penetrable block, and
   means rendered effective upon displacing of said package for returning the withdrawal means and lead supporting means to the initial position to advance the penetrable block onto the leads.

5. Apparatus for removing an electrical component having a head and depending lead from a work holder, and for simultaneously straightening the lead, which comprises:

means for supporting a work holder for linear movement, means for clamping and holding the head of a component mounted in the work holder against movement, straightening means mounted for engagement with the leads adjacent the head of the component, drive means for moving the supporting means and the work holder relative to the clamped component to separate one from the other, and resilient means rendered effective by the movement of the supporting means for sliding the straightening means along the length of the lead to straighten the lead.

6. A machine for removing an electrical component having a head and a depending lead from a work holder and for simultaneously straightening the lead, which comprises:

a carriage having a cavity for receiving and holding a work holder in which is mounted a component, a pair of opposed clamping jaws one mounted on either side of the head of the component, a pair of opposed lead straightening combs one mounted beneath each clamping jaw and biased for sliding movement therewith into engagement with the lead, means for moving the clamping jaws and lead straightening combs into engagement with the head and lead respectively, means for advancing the carriage away from the clamped component to separate the component from the work holder, and biasing means for moving the straightening combs with the advancing carriage and along the length of the lead to straighten the lead.

7. A machine for removing an electrical component having a head and a depending lead from a work holder and for simultaneously straightening the lead, which comprises:

holding means for receiving and grasping a block in which is mounted the lead of an electrical component, means slidably mounted for clamping the head of the component, straightening means mounted for movement with the clamping means for engaging the lead of the component, means for advancing the clamping means into engagement with the head to prevent movement thereof, a first resilient means rendered effective by advancement of the clamping means for advancing the straightening means into engagement with the lead, means for moving the holding means away from the clamped component to separate the component from the block, and a second resilent means rendered effective by the movement of the holding means for sliding the straightening means along the length of the lead to straighten the lead.

8. A machine for removing an electrical component having a head and depending lead from a block and for simultaneously straightening the lead, which comprises:

a carriage having a T-shaped projection at one end thereof and having a cavity for retaining a block, a yoke for driving the carriage having a pair of arms slidable along the stem of the T-shaped projection for engagement with the head of the T, said arms being normally spaced from the head to provide a lost motion connection, a spring mounted between the carriage and the yoke for supporting the carriage, means for retracting the yoke relative to the spring supported carriage by the amount of the lost motion and then moving the yoke and carriage in unison, clamping means rendered effective by the retraction of the yoke during the lost motion for grasping the head of the component to prevent movement thereof, straightening means biased for movement with the clamping means for engaging the lead of the component, and resilient means for moving the straightening means in unison with the yoke and carriage and along the length of the lead to straighten the lead.

9. A machine for transferring electrical components having a head and a depending lead from a first work holder to a second work holder and for simultaneously straightening the leads, which comprises:

a carriage mounted for reciprocating movement, holding means on the carriage for resiliently gripping a first work holder, means for engaging the head of a component mounted in the first work holder to prevent movement of the component as the carriage is reciprocated, straightening means mounted for engagement with the lead adjacent the head of the component, means for simultaneously retracting the carriage and lead straightening means to separate the component from the work holder and straighten the lead, means rendered effective by movement of the carriage for replacing the first work holder in the carriage with a second work holder of penetrable material, and means for advancing the penetrable work holder into embedding engagement with the straightened lead while advancing the lead straightening means along the lead.

10. A transfer mechanism for removing electrical components from a first block and inserting the components into a penetrable second block, which comprises:

a reciprocal carriage having a cavity to retain a first block, means for positioning a block in the cavity, opposed clamping means supported for movement into grasping engagement with the body of a component mounted in the block to hold the component against movement, opposed straightening means mounted for engagement with a lead of the component, means for advancing the clamping means into contact with the component body and the straightening means into contact with the lead, means for moving the carriage and block relative to the clamped component to effect separation, resilient means rendered effective by the movement of the carriage for sliding the straightening means along the length of the lead to straighten the lead, means for advancing a penetrable block into the cavity to displace the empty first block, and means rendered effective by the last mentioned advancing means for moving the penetrable block into embedding engagement with the straightened lead while advancing the lead straightening means along the lead.

11. A machine for transferring an electrical component having a head and a depending lead from a first block to a penetrable block and for simultaneously straightening the lead, which comprises:

a carriage mounted for reciprocating movement having a clamp for holding a block containing an electrical component, reciprocating drive means having a lost motion connection for retracting the carriage to separate the component from the block, clamping means and straightening means rendered effective during the lost motion of the drive means for grasping the head of the component to prevent movement thereof, and for engaging the lead, respectively, resilient means rendered effective at the termination of the lost motion for sliding the lead straightening means along the length of the lead to straighten the lead, means for stopping the lead straightening means at the end of the lead to provide support therefor, means rendered effective on the cessation of retraction of the carriage to displace the now empty block with a penetrable block in the carriage, means for reversing the drive means to advance the penetrable block into engagement with the lead of the suspended component and against the force of the resilient means to slide the straightening means back along the length of the lead and package in the block, and means rendered effective at the cessation of advancement of the block and during the lost motion of the drive means for disengaging the clamping means and straighteing means.

12. In an apparatus for removing a row of diodes having leads extending into a first block and inserting said leads into a penetrable second block, a carriage for receiving and supporting said first block, a yoke coupled to said carriage for limited movement relative to said carriage, a pair of opposed clamp means mounted for movement toward diodes in said block, means for initially moving the yoks away from said carriage whereafter continued movement of said yoke moves said carriage away from said clamps, means operated upon the initial movement of said yoke for moving said clamp means to grip said diodes, whereupon subsequent movement of said carriage moves the block from the leads extending from said gripped diodes, a pair of spaced combs mounted for movement toward said leads and along said leads, resilient means rendered effective by movement of said clamps for advancing the combs into engagement with said leads, springs for urging said combs to move with said carriage, a pair of spaced stops for engaging and limiting movement of said combs with said carriages to leave the ends of said leads projecting beyond said combs, shuttle means operated upon completion of movement of said carriage for advancing said penetrable second block to displace said first block from said carriage, means responsive to the shuttle means advancing said penetrable second block into the carriage for advancing the carriage toward the clamps whereupon the penetrable block is forced onto said leads and said combs are returned with the carriage against the urging of said springs, and means rendered effective upon completion of the return movement of the combs for moving the combs against the resilient means and away from the leads.

References Cited by the Examiner
UNITED STATES PATENTS

| | | | |
|---|---|---|---|
| 2,970,709 | 2/1961 | Gartner et al. | 214—301 |
| 3,007,291 | 11/1961 | Jordan et al. | 53—200 |
| 3,075,562 | 1/1963 | Jankowski | 140—147 |
| 3,245,193 | 4/1966 | Schmidt | 140—147 |

CHARLES W. LANHAM, *Primary Examiner.*

L. A. LARSON, *Assistant Examiner.*

UNITED STATES PATENT OFFICE
CERTIFICATE OF CORRECTION

Patent No. 3,286,740 November 22, 1966

Francis J. Fuchs, Jr., et al.

It is hereby certified that error appears in the above numbered patent requiring correction and that the said Letters Patent should read as corrected below.

Column 1, line 36, for "may" read -- many --; column 2, line 53, for "section" read -- sectional --; column 3, line 8, for "elevational" read -- elevation --; line 49, for "piston" read -- pinion --; column 11, line 14, after "package" insert -- the lead --; line 28, for "yoks" read -- yoke --.

Signed and sealed this 12th day of September 1967.

(SEAL)
Attest:

ERNEST W. SWIDER
Attesting Officer

EDWARD J. BRENNER
Commissioner of Patents